United States Patent
Morita

(10) Patent No.: US 9,537,550 B2
(45) Date of Patent: Jan. 3, 2017

(54) MOBILE COMMUNICATION SYSTEM, USER TERMINAL, AND PROCESSOR

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/440,585

(22) PCT Filed: Nov. 1, 2013

(86) PCT No.: PCT/JP2013/079733
§ 371 (c)(1),
(2) Date: May 4, 2015

(87) PCT Pub. No.: WO2014/073488
PCT Pub. Date: May 15, 2014

(65) Prior Publication Data
US 2015/0256242 A1    Sep. 10, 2015

Related U.S. Application Data

(60) Provisional application No. 61/723,037, filed on Nov. 6, 2012.

(51) Int. Cl.
*H04B 7/04* (2006.01)
*H04L 25/03* (2006.01)
(Continued)

(52) U.S. Cl.
CPC .......... *H04B 7/0456* (2013.01); *H04B 7/0639* (2013.01); *H04L 5/0023* (2013.01);
(Continued)

(58) Field of Classification Search
CPC ................. H04B 7/0456; H04B 7/0639; H04L 25/03942; H04L 5/0023; H04L 5/001; H04W 72/02; H04W 72/0413; H04W 76/02; H04W 84/042
(Continued)

(56) References Cited

U.S. PATENT DOCUMENTS

| 2010/0002643 A1* | 1/2010 | Han | H04B 7/0417 370/329 |
| 2010/0232539 A1* | 9/2010 | Han | H04B 7/024 375/285 |

(Continued)

FOREIGN PATENT DOCUMENTS

WO    2011/005048 A2    1/2011

OTHER PUBLICATIONS

IEEE 802.16 Broadband Wireless Access Working Group, Multi-cell MIMO Schemes for IEEE 802.16m, Jul. 7, 2008.*
(Continued)

*Primary Examiner* — Freshteh N Aghdam
(74) *Attorney, Agent, or Firm* — Studebaker & Brackett PC

(57) ABSTRACT

In a mobile communication system, a base station performs downlink multi-antenna transmission by applying a precoder matrix for defining downlink transmission directivity. The mobile communication system includes a first user terminal that selects one of first precoder matrix information and second precoder matrix information as precoder matrix information to be fed back to the base station. The precoder matrix information is referred to determine, in the base station, the precoder matrix to be applied to transmission to a second user terminal that establishes a connection with the base station. The first precoder matrix information indicates the precoder matrix that is preferred to the first user terminal. The second precoder matrix information indicates the precoder matrix that is not preferred to the first user terminal.

10 Claims, 14 Drawing Sheets

(51) Int. Cl.
*H04L 5/00* (2006.01)
*H04B 7/06* (2006.01)
*H04W 72/02* (2009.01)
*H04W 72/04* (2009.01)
*H04W 76/02* (2009.01)
*H04W 84/04* (2009.01)

(52) U.S. Cl.
CPC ....... *H04L 25/03942* (2013.01); *H04W 72/02* (2013.01); *H04L 5/001* (2013.01); *H04W 72/0413* (2013.01); *H04W 76/02* (2013.01); *H04W 84/042* (2013.01)

(58) Field of Classification Search
USPC .................. 375/219, 260, 267, 295, 316
See application file for complete search history.

(56) References Cited

U.S. PATENT DOCUMENTS

| | | | |
|---|---|---|---|
| 2011/0009125 A1 | 1/2011 | Shin et al. | |
| 2011/0092232 A1* | 4/2011 | Lee | H04B 7/0639 455/501 |
| 2011/0176629 A1 | 7/2011 | Bayesteh et al. | |
| 2012/0045018 A1* | 2/2012 | Zhou | H04B 7/0434 375/296 |
| 2012/0087332 A1* | 4/2012 | Kim | H04B 7/063 370/329 |
| 2012/0106470 A1 | 5/2012 | Clerckx et al. | |
| 2012/0163487 A1 | 6/2012 | Koyanagi et al. | |
| 2012/0328035 A1* | 12/2012 | Yoon | H04B 7/0626 375/260 |
| 2013/0279403 A1* | 10/2013 | Takaoka | H04L 5/0035 370/328 |

OTHER PUBLICATIONS

International Search Report; PCT/JP2013/079733; Jan. 21, 2014.
Written Opinion of the International Searching Authority; PCT/JP2013/079733; Jan. 21, 2014.
3GPP TS 36.300 V11.3.0 (Sep. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); pp. 1-205.
The extended European search report issued by the European Patent Office on Apr. 8, 2016, which corresponds to European Patent Application No. 13853846.7-1874 and is related to U.S. Appl. No. 14/440,585.

* cited by examiner

MOBILE COMMUNICATION SYSTEM, USER TERMINAL, AND PROCESSOR

TECHNICAL FIELD

The present invention relates to a mobile communication system, a user terminal, and a processor that support downlink multi-antenna transmission.

BACKGROUND ART

An LTE system of which the specifications are formulated in 3GPP (3rd Generation Partnership Project), which is a project aiming to standardize a mobile communication system, supports downlink multi-antenna transmission (for example, see Non Patent Document 1).

In order to realize the downlink multi-antenna transmission in an FDD scheme, a user terminal feeds back a combination of precoder matrix information indicating a precoder matrix and rank information indicating a rank to a base station. The precoder matrix determines the transmission directivity, and the rank determines the number of signal sequences (number of layers).

The base station performs the downlink multi-antenna transmission by applying the precoder matrix and the rank based on the feedback information (a combination of the precoder matrix information and the rank information) fed back by each user terminal.

PRIOR ART DOCUMENTS

Non Patent Documents

Non Patent Document 1: 3GPP Technology Specifications "TS 36.300 V11.3.0" (September, 2012)

SUMMARY OF INVENTION

The current specifications define that specific type of precoder matrix information is fixedly fed back as feedback information for a target frequency band (an entire downlink band or a subband). However, it is difficult to appropriately execute the downlink multi-antenna transmission by such a feedback method.

Thus, the present invention provides a mobile communication system, a user terminal, a base station, and a processor with which it is possible to appropriately execute the downlink multi-antenna transmission.

According to one embodiment, in a mobile communication system, a base station performs downlink multi-antenna transmission by applying a precoder matrix for defining downlink transmission directivity. The mobile communication system includes a first user terminal configured to select one of first precoder matrix information and second precoder matrix information as precoder matrix information to be fed back to the base station. The precoder matrix information is referred to determine, in the base station, the precoder matrix to be applied to transmission to a second user terminal establishing a connection with the base station. The first precoder matrix information indicates the precoder matrix that is preferred to the first user terminal. The second precoder matrix information indicates the precoder matrix that is not preferred to the first user terminal.

DESCRIPTION OF EMBODIMENTS

Overview of Embodiment

Figure 1:
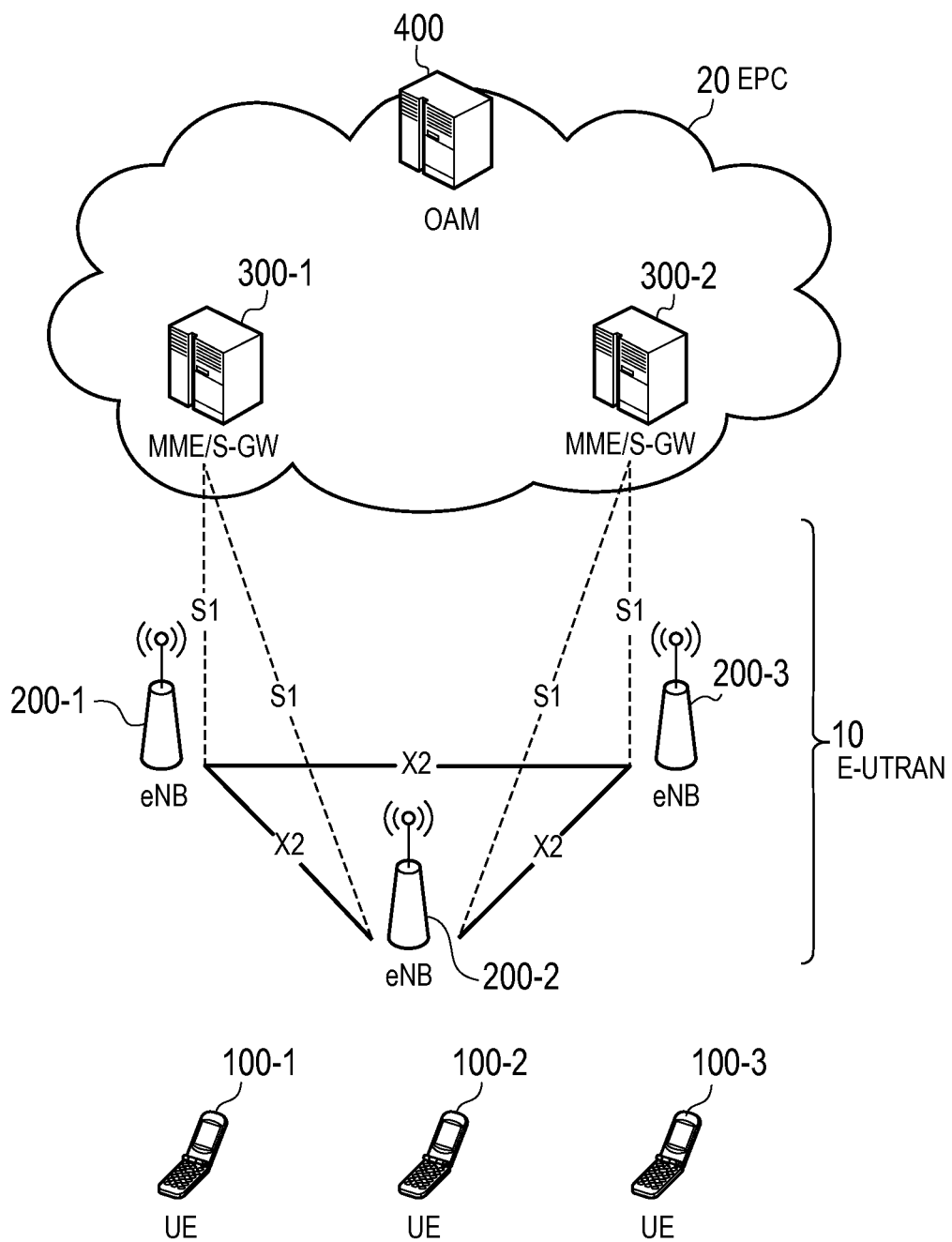
FIG. 1 is a configuration diagram of an LTE system.

In a mobile communication system according to an embodiment, a base station performs downlink multi-antenna transmission by applying a precoder matrix for defining downlink transmission directivity. The mobile communication system includes a first user terminal that selects one of first precoder matrix information and second precoder matrix information as precoder matrix information to be fed back to the base station. The precoder matrix information is referred to determine, in the base station, the precoder matrix to be applied to transmission to a second user terminal that establishes a connection with the base station. The first precoder matrix information indicates the precoder matrix that is preferred to the first user terminal. The second precoder matrix information indicates the precoder matrix that is not preferred to the first user terminal. In addition, the precoder matrix preferred to the first user terminal is a precoder matrix in which interference to the first user terminal is small (that is, a precoder matrix in which a null is directed toward the first user terminal). On the other hand, the precoder matrix not preferred to the first user terminal is a precoder matrix in which interference to the first user terminal is large (that is, a precoder matrix in which a beam is directed toward the first user terminal).

In this way, it is possible to separately use the first precoder matrix information and the second precoder matrix information according to a situation. For example, the first user terminal selects one of the first precoder matrix information and the second precoder matrix information such that the amount of information to be fed back is reduced.

When plural pieces of the first precoder matrix information are fed back to the base station and number of the plural pieces of first precoder matrix information is equal to or more than a threshold value, the first user terminal switches the precoder matrix information, which is to be fed back to the base station, to the second precoder matrix information. Furthermore, when the number of the plural pieces of first precoder matrix information is equal to or more than the threshold value (that is, in the situation in which a number of preferred precoder matrixes are notified), the number of non-preferred precoder matrixes is adversely reduced. Thus, in such a situation, the precoder matrix information to be fed back is switched to the second precoder matrix information (that is, a non-preferred precoder matrix is switched to be notified), so that it is possible to reduce the amount of information to be fed back.

When plural pieces of the second precoder matrix information are fed back to the base station and number of the plural pieces of second precoder matrix information is equal to or more than a threshold value, the first user terminal switches the precoder matrix information, which is to be fed back to the base station, to the first precoder matrix information.

Furthermore, when number of the plural pieces of second precoder matrix information is equal to or more than the threshold value (that is, in the situation in which a number of non-preferred precoder matrixes are notified), the number of preferred precoder matrixes is adversely reduced. Thus, in such a situation, the precoder matrix information to be fed back is switched to the first precoder matrix information (that is, a preferred precoder matrix is switched to be notified), so that it is possible to reduce the amount of information to be fed back.

When the first precoder matrix information is selected, the first user terminal adds first identification information to the first precoder matrix information and feeds back the first precoder matrix information to the base station, wherein the first identification information indicates that the precoder matrix information to be fed back to the base station is the first precoder matrix information.

In this way, the base station is able to recognize that fed-back precoder matrix information is the first precoder matrix information.

When the second precoder matrix information is selected, the first user terminal adds second identification information to the second precoder matrix information and feeds back the second precoder matrix information to the base station, wherein the second identification information indicates that the precoder matrix information to be fed back to the base station is the second precoder matrix information.

In this way, the base station is able to recognize that fed-back precoder matrix information is the first precoder matrix information.

The base station performs the downlink multi-antenna transmission by further applying a rank for defining number of downlink signal sequences. For each of plural pieces of rank information, the first user terminal may select one of the first precoder matrix information and the second precoder matrix information as the precoder matrix information to be fed back to the base station.

In this way, it is possible to separately use the first precoder matrix information and the second precoder matrix information for each rank information.

When the first user terminal selects and feeds back the first precoder matrix information, the base station assigns a radio resource, which is equal to that assigned to the first user terminal, to the second user terminal that feeds back precoder matrix information coinciding with the first precoder matrix information, and performs transmission to the second user terminal according to the coinciding precoder matrix information.

In this way, it is possible to reliably perform transmission to the second user terminal while suppressing interference to the first user terminal.

When the first user terminal selects and feeds back the second precoder matrix information, the base station assigns a radio resource, which is equal to that assigned to the first user terminal, to the second user terminal that feeds back precoder matrix information not coinciding with the second precoder matrix information, and performs transmission to the second user terminal according to the non-coinciding precoder matrix information.

In this way, it is possible to reliably perform transmission to the second user terminal while suppressing interference to the first user terminal.

The base station forms a cell adjacent to a serving cell of the first user terminal.

Alternatively, the base station forms a serving cell of the first user terminal.

A user terminal according to the embodiment is used in a mobile communication system in which a base station performs downlink multi-antenna transmission by applying a precoder matrix for defining downlink transmission directivity. The user terminal includes a controller that selects one of first precoder matrix information and second precoder matrix information as precoder matrix information to be fed back to the base station. The precoder matrix information is referred to when the base station determines the precoder matrix to be applied to transmission to another user terminal that establishes a connection with the base station. The first precoder matrix information indicates the precoder matrix that is preferred to the user terminal. The second precoder matrix information indicates the precoder matrix that is not preferred to the user terminal.

A processor according to the embodiment is provided in a user terminal in a mobile communication system in which a base station performs downlink multi-antenna transmission by applying a precoder matrix for defining downlink transmission directivity. The processor selects one of first precoder matrix information and second precoder matrix information as precoder matrix information to be fed back to the base station. The precoder matrix information is referred to when the base station determines the precoder matrix to be applied to transmission to another user terminal that establishes a connection with the base station. The first precoder matrix information indicates the precoder matrix that is preferred to the user terminal. The second precoder matrix information indicates the precoder matrix that is not preferred to the user terminal.

First Embodiment

Hereinafter, with reference to the accompanying drawings, a description will be provided for an embodiment when the present invention is applied to a mobile communication system (an LTE system) configured according to 3GPP standards.

(LTE System)

FIG. 1 is a configuration diagram of an LTE system according to the present embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 corresponds to a radio access network and the EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 forms a cell and performs radio communication with UE 100 established a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM 400 (Operation and Maintenance).

The MME is a network node for performing various mobility controls, for example, for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
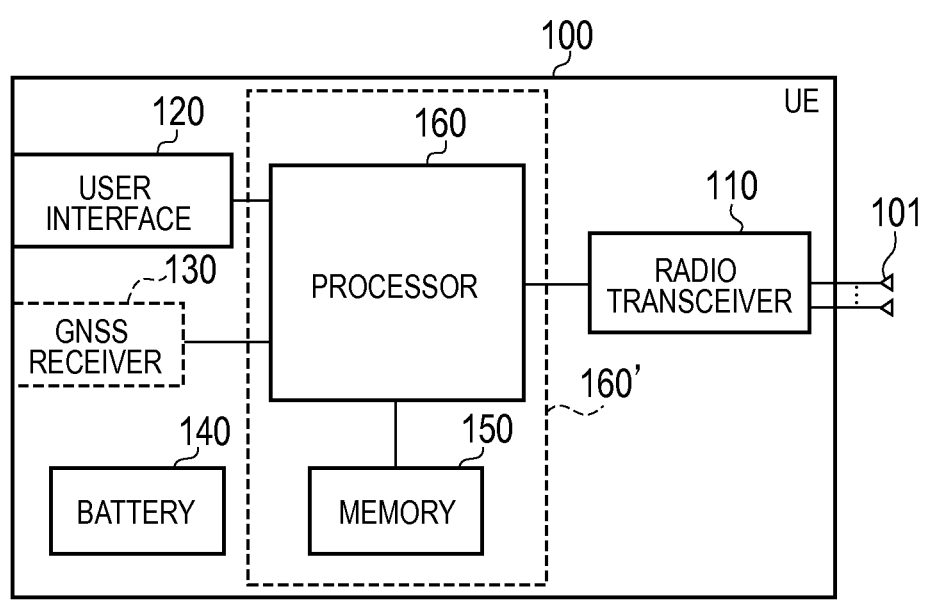
FIG. 2 is a block diagram of UE.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 configure a controller.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

In the present embodiment, the processor 160 generates channel state information (CSI) on the basis of a signal received by the radio transceiver 110 (particularly, a reference signal), and then feeds back the channel state information to the serving cell or the neighboring cell. The channel state information includes PMI (Precoding Matrix Indicator), RI (Rank Indicator), and CQI (Channel Quality Indicator), for example.

In addition, the memory 150 holds a set (a codebook) of candidates of the PMI, and the processor 160 selects one PMI from the codebook and feeds back the PMI.

An "entire downlink band" or a "subband" is stipulated as the frequency unit (the target frequency band) that is to be fed back, and which one to use is determined in accordance with the instruction from the eNB 200. A subband is a frequency unit obtained by dividing the entire downlink band, and includes the bandwidth of a plurality of resource blocks. The details of the information that is fed back (such as the PMI, the RI, and the CQI) are described later.

Figure 3:
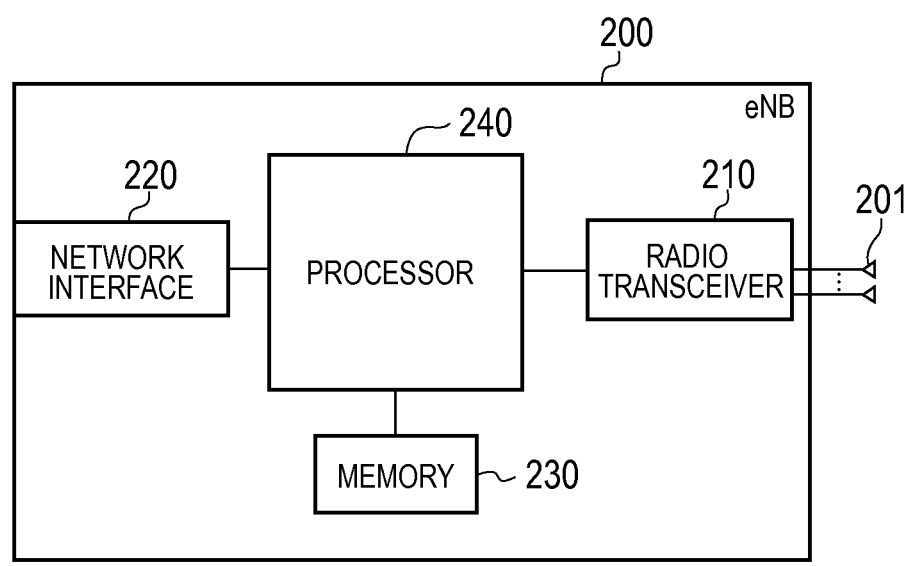
FIG. 3 is a block diagram of eNB.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 configure a controller.

The antenna 201 and the radio transceiver 210 are used to transmit and receive a radio signal. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, and encoding and decoding of the baseband signal and a CPU that performs various processes by executing the program stored in the memory 230. The processor 240 implements various processes and various communication protocols described later.

Figure 4:
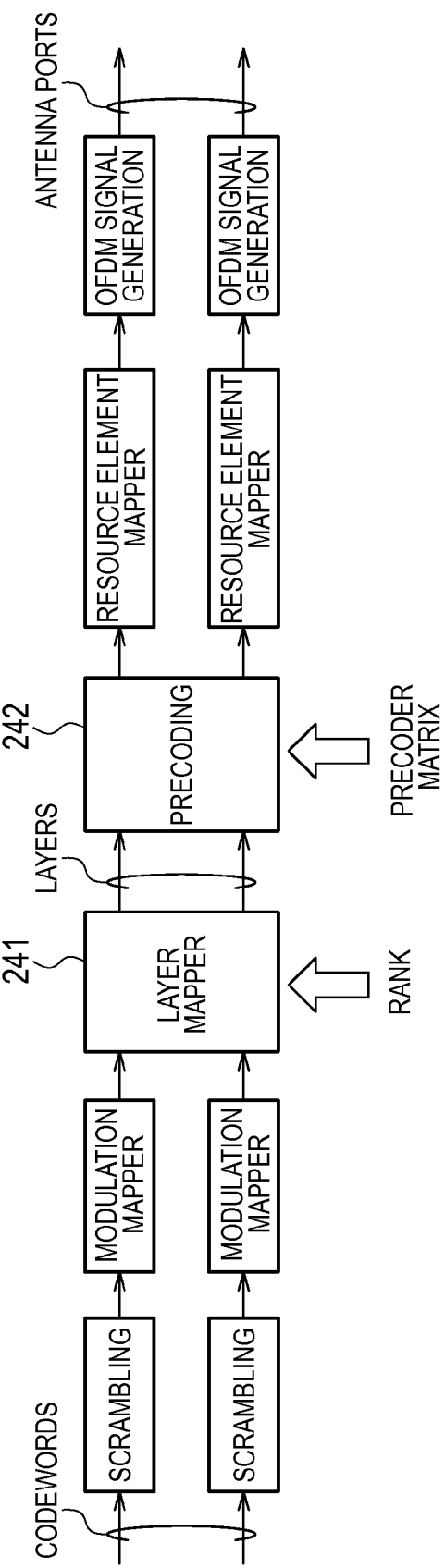
FIG. 4 is a block diagram related to downlink multi-antenna transmission.

In the present embodiment, the processor 240 performs downlink multi-antenna transmission by applying the precoder matrix and the rank. FIG. 4 is a block diagram of the processor 240 related to the downlink multi-antenna transmission. The details of each block are described in 3GPP TS 36.211, for example. However, an overview of each block will be described herein.

As illustrated in FIG. 4, one or two codewords to be transmitted via a physical channel are scrambled, are modulated into a modulation symbol, and then are mapped to a plurality of layers by a layer mapper 241. The codeword is an error correction data unit. The rank (number of layers) is determined on the basis of the RI that is fed back.

A precoder 242 precodes a modulation symbol of each layer by using a precoder matrix. The precoder matrix is determined on the basis of the PMI that is fed back. The precoded modulation symbol is mapped to a resource element, is converted into an OFDM signal of a temporal domain, and is output to each antenna port.

Figure 5:
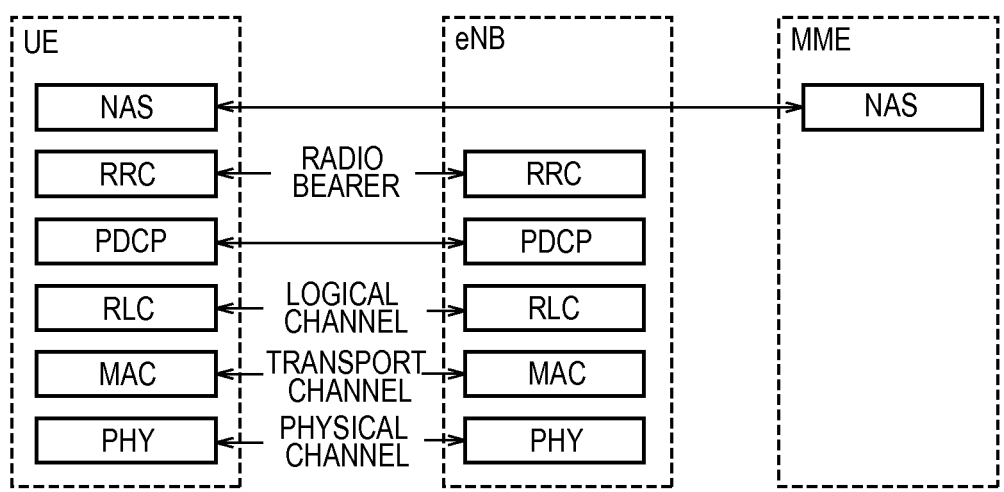
FIG. 5 is a protocol stack diagram of a radio interface in the LTE system.

FIG. 5 is a protocol stack diagram of a radio interface in the LTE system.

As illustrated in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme, and the like) of an uplink and a downlink, and an assigned resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (RRC Connected State), and otherwise, the UE 100 is in an idle state (RRC Idle State).

A NAS (Non-Access Stratum) layer positioned above the RRC layer performs session management or mobility management, for example.

Figure 6:
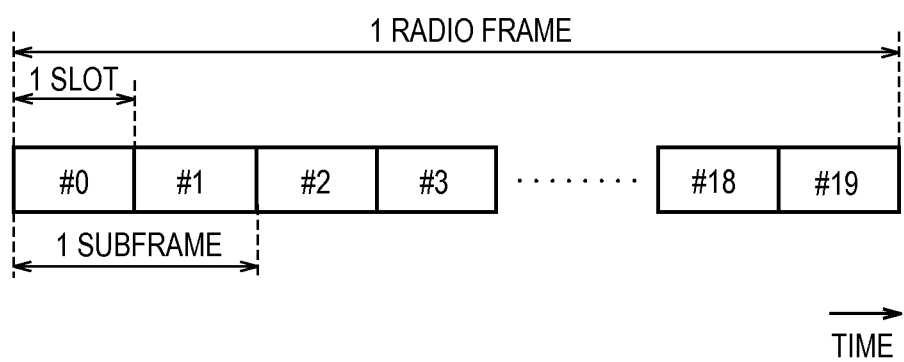
FIG. 6 is a configuration diagram of a radio frame used in the LTE system.

FIG. 6 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As a duplex scheme, either an FDD (Frequency Division Duplex) scheme or a TDD (Time Division Duplex) scheme is used. However, in the present embodiment, the FDD scheme is mainly assumed.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, reference signals such as cell-specific reference signals (CRSs) are distributed and arranged.

The PDCCH carries the control information. The control information, for example, includes the uplink SI (Scheduling Information), the downlink SI, and a TPC bit. The uplink SI is information indicating the assignment of uplink radio resources, and the downlink SI is information indicating the assignment of downlink radio resources. The TPC bit is information for instructing an increase or decrease in the uplink transmission power.

The PDSCH carries the control information and/or user data. For example, a downlink data region may be assigned only to the user data, or may be assigned such that the user data and the control information are multiplexed.

In the uplink, both ends, in the frequency direction, of each subframe are control regions mainly used as a physical uplink control channel (PUCCH). Furthermore, the center portion, in the frequency direction, of each subframe is a region mainly used as a physical uplink shared channel (PUSCH).

The PUCCH carries the control information. The control information includes, for example, the CQI, the PMI, the RI, the SR (Scheduling Request), and the ACK/NACK.

The CQI is information (an index) indicating a modulation and coding scheme (that is, recommended MCS), which is preferred to be used in the downlink, based on a downlink reception status.

The PMI is information (an index) indicating a precoder matrix that is preferred to be used in the downlink. In other words, the PMI indicates a precoder matrix in which a beam is directed toward UE that is a transmission source of the PMI. For example, in order for the reception status of the UE 100 to improve, the UE 100 selects the PMI to be fed back to the eNB 200.

The RI is information (an index) indicating a rank that is preferred to be used in the downlink. For example, in order for the rank corresponding to the reception status of the UE 100 to be applicable, the UE 100 selects the PMI to be fed back to the eNB 200.

The SR is information for requesting the assignment of uplink radio resources.

The ACK/NACK is information indicating whether or not the decoding of a signal transmitted via a downlink physical channel (for example, the PDSCH) is successful.

The PUSCH is a physical channel that carries the control information and/or user data. For example, an uplink data region may be assigned only to the user data, or may be assigned such that the user data and the control information are multiplexed.

Operation According to First Embodiment

Hereinafter, an operation according to the present embodiment will be described.

(1) Entire Operation

Figure 7:
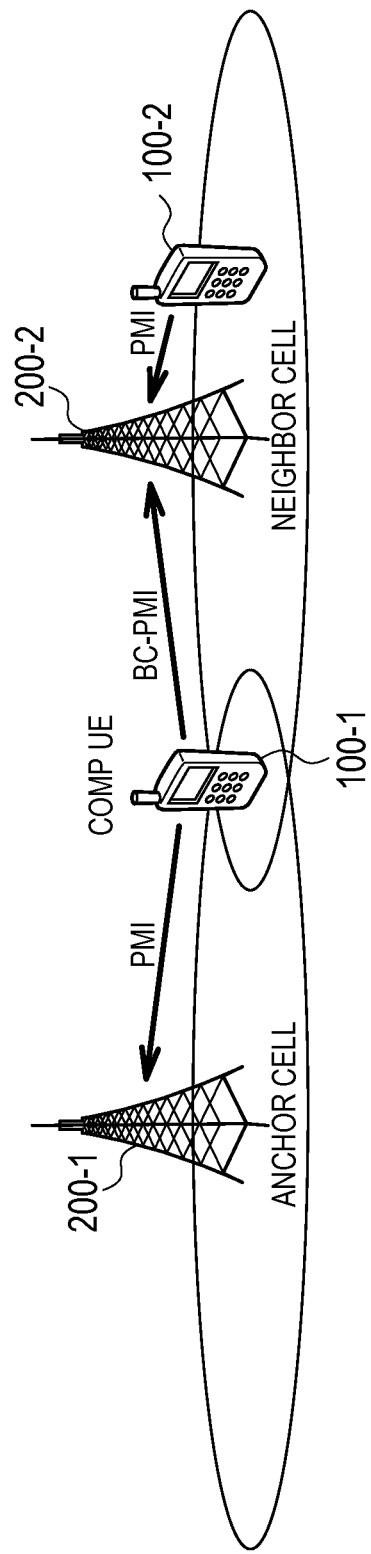
FIG. 7 is a diagram illustrating an operation environment according to a first embodiment.
Figure 8:
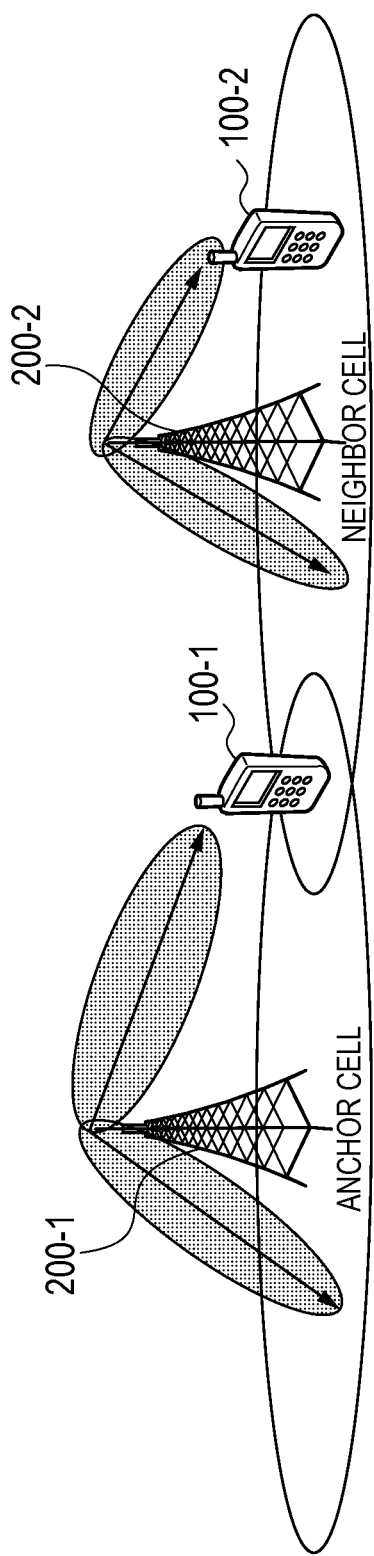
FIG. 8 is a diagram illustrating an operation environment according to the first embodiment.

FIG. 7 and FIG. 8 are diagrams illustrating operation environments according to the present embodiment. In FIG. 7 and FIG. 8, eNB 200-1 and eNB 200-2 configure cells that are adjacent to each other.

As illustrated in FIG. 7, UE 100-1 establishes a connection with the cell of the eNB 200-1. That is, the UE 100-1 performs communication by assuming the cell of the eNB 200-1 as the serving cell.

In the present embodiment, the UE 100-1 is positioned in the boundary region of the respective cells of the eNB 200-1 and the eNB 200-2. In such a case, normally, the UE 100-1 receives the influence of the interference from the cell of the eNB 200-2.

UE 100-2 establishes a connection with the cell of the eNB 200-2. That is, the UE 100-2 performs communication by assuming the cell of the eNB 200-2 as the serving cell. In FIG. 7, only one UE 100-2 is illustrated, however, a plurality of UEs 100-2 may establish a connection with the cell of the eNB 200-2.

The eNB 200-1 and the eNB 200-2 perform CB (Coordinated Beamforming)-CoMP (Coordinated Multi Point) in order to improve throughput of the UE 100-1 positioned at the edge of the cell of the eNB 200-1. In the CB-CoMP, a serving cell of the UE 100-1 is called an "anchor cell". In the CB-CoMP, the serving cell of the UE 100-1 is called an "anchor cell".

Furthermore, in the CB-CoMP, the eNB 200-2, which acts as the main interference source, adjusts the transmission directivity so as to reduce the influence of the interference exerted on the UE 100-1. Specifically, the eNB 200-2 performs transmission to the UE 100-2 by directing a beam to the UE 100-2 while directing a null to the UE 100-1.

The UE 100-1 that is the target of the CB-CoMP performs a special feedback to the eNB 200-2 in addition to the normal feedback (the PMI, the RI, and the CQI) to the eNB 200-1. In the present embodiment, the UE 100-1 feeds back the special PMI to the eNB 200-2.

The normal PMI is used to determine a precoder matrix to be applied to downlink multi-antenna transmission to the UE 100-1, and is information (an index) indicating a precoder matrix (a precoder matrix in which a beam is directed toward the UE 100-1) that is preferred to the UE 100-1. The UE 100-1 performs the feedback of the normal PMI on the basis of the reference signal, for example, received from the eNB 200-1.

On the other hand, the special PMI is used to determine a precoder matrix to be applied to downlink multi-antenna transmission to UE 100 (for example, the UE 100-2) other than the UE 100-1, and is information (an index) indicating a precoder matrix (that is, a precoder matrix in which a null is directed toward the UE 100-1) that is preferred to the UE 100-1. Such PMI is called BC (Best Companion)-PMI. In the present embodiment, the BC-PMI corresponds to first precoder matrix information.

The UE 100-1 performs the feedback of the BC-PMI on the basis of, for example, the reference signal received from the eNB 200-2. In addition, the UE 100-1 may feed back the BC-PMI to the eNB 200-2 via the serving cell (the eNB 200-1) or may directly feed back the BC-PMI to the eNB 200-2.

In the present embodiment, the UE 100-1 feeds back a plurality of BC-PMIs for a frequency unit (a target frequency band) to be fed back. The plurality of BC-PMIs, for example, are PMIs (BC-PMIs) in which the influence of interference from the eNB 200-2 is smaller than a threshold value.

The eNB 200-2 assigns a radio resource, which is equal to that assigned to the UE 100-1, to the UE 100-2 in the cell of the eNB 200-2, which feeds back PMI that coincides with one of the plurality of BC-PMIs fed back from the UE 100-1. In addition, the assumption is that the eNB 200-2 dynamically and quasi-statically shares scheduling information of the UE 100-1 with the eNB 200-1. Then, the eNB 200-2 performs transmission to the UE 100-2 according to the coinciding PMI.

As a result, as illustrated in FIG. 8, the eNB 200-2 can perform transmission to the UE 100-2 by directing a beam to the UE 100-2 while directing a null to the UE 100-1. In this way, it is possible to suppress interference to the UE 100-1 and improve the throughput of the UE 100-1.

Meanwhile, when there is no UE 100-2 in the cell of the eNB 200-2, which feeds back the PMI that coincides with one of the plurality of BC-PMIs fed back from the UE 100-1, the eNB 200-2 may perform two operations, that is, does not perform the assignment of the radio resource, which is equal to that assigned to the UE 100-1, or performs assignment even in a non-coinciding PMI.

In addition, the eNB 200-1 performs transmission to the UE 100-1 according to the normal PMI fed back from the UE 100-1. As a result, the eNB 200-1 is able to direct a beam to the UE 100-1.

However, in the aforementioned CB-CoMP operation, when the number of BC-PMIs to be fed back by the UE 100-1 is large, there is a problem that the amount of information to be fed back is large and a consumption amount of a radio resource is large.

In this regard, in the present embodiment, when a plurality of BC-PMIs are fed back to the eNB 200-2 and the number of the BC-PMIs is equal to or more than a threshold value Tc, the UE 100-1 switches PMI, which is fed back to the eNB 200-2, to WC (Worst Companion)-PMI. The WC-PMI is used to determine a precoder matrix that is applied to downlink multi-antenna transmission to UE 100 (for example, the UE 100-2) other than the UE 100-1, and is information (an index) indicating a precoder matrix (that is, a precoder matrix in which a beam is directed toward the UE 100-1) that is not preferred to the UE 100-1. In the present embodiment, the WC-PMI corresponds to second precoder matrix information.

When the number of BC-PMIs is equal to or more than a threshold value Tc (that is, in the situation in which a plurality of preferred precoder matrixes are notified), the number of non-preferred precoder matrixes is adversely reduced. Thus, in such a situation, PMI to be fed back is switched to the WC-PMI (that is, a non-preferred precoder matrix is switched to be notified), so that it is possible to reduce the amount of information to be fed back.

In addition, the threshold value Tc may be set in the UE 100-1 in advance or may be set in the UE 100-1 from the eNB 200-1 or the eNB 200-2. When the threshold value Tc has been set in the UE 100-1 in advance, the threshold value Tc, for example, may be set to ½ of the number of all PMIs. Hereinafter, a description will be provided for the case in which the eNB 200-1 or the eNB 200-2 sets the threshold value Tc in the UE 100-1.

An operation of the eNB 200-2 when the UE 100-1 feeds back WC-PMI is as follows. Specifically, the eNB 200-2 assigns a radio resource, which is equal to that assigned to the UE 100-1, to the UE 100-2 that feeds back PMI that does not coincide with the WC-PMI that is fed back, and performs transmission to the UE 100-2 according to the non-coinciding PMI.

As a consequence, as illustrated in FIG. 8, the eNB 200-2 is able to perform transmission to the UE 100-2 by not directing a beam toward the UE 100-1 and directing a beam toward the UE 100-2. In this way, it is possible to suppress interference to the UE 100-1 and improve the throughput of the UE 100-1.

Furthermore, in the present embodiment, since the UE 100-1 selectively feeds back the BC-PMI or the WC-PMI, it is necessary for the eNB 200-2 to identify whether PMI fed back from the UE 100-1 is the BC-PMI or the WC-PMI.

Thus, when the BC-PMI is selected, the UE 100-1 adds first identification information to the BC-PMI and feeds back the BC-PMI to the eNB 200-2, wherein the first identification information indicates that PMI to be fed back to the eNB 200-2 is the BC-PMI.

On the other hand, when the WC-PMI is selected, the UE 100-1 adds second identification information to the WC-PMI and feeds back the WC-PMI to the eNB 200-2, wherein the second identification information indicates that PMI to be fed back to the eNB 200-2 is the WC-PMI.

(2) Operation Flow

Figure 9:
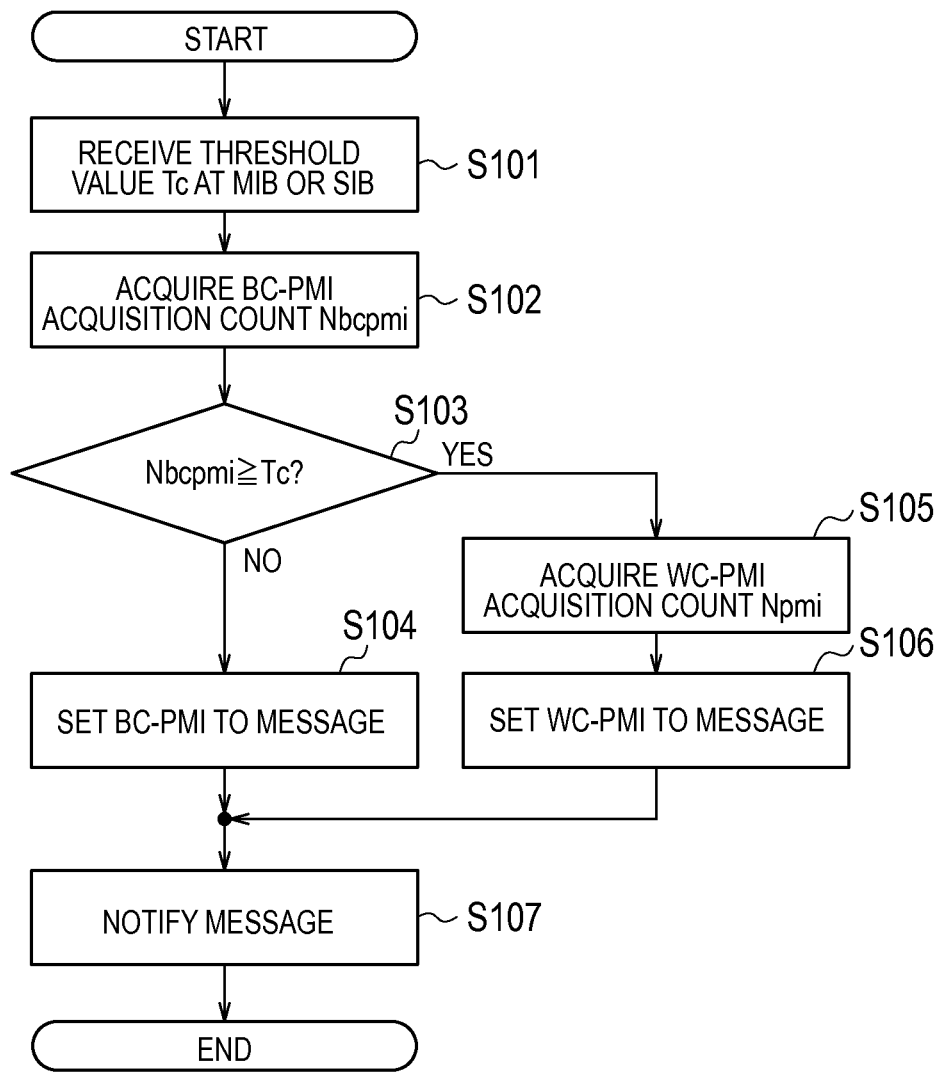
FIG. 9 is an operation flow diagram of UE according to the first embodiment.

FIG. 9 is an operation flow diagram of the UE 100-1 according to the present embodiment. Hereinafter, the case is assumed, in which the BC-PMI is not fed back for each subband and is fed back for an entire downlink band.

As illustrated in FIG. 9, in step S101, the UE 100-1 receives information indicating the threshold value Tc from the eNB 200-1 or the eNB 200-2 and stores the information. For example, the information indicating the threshold value Tc is transmitted as a part of system information. The system information is transmitted via BCCH that is a kind of a logical channel. A master information block (MIB) of the system information is mapped to BCH that is a kind of a transport channel. A system information block (SIB) of the system information is mapped to DL-SCH that is a kind of a transport channel.

In step S102, on the basis of a reference signal and the like from the eNB 200-2, the UE 100-1 calculates an evaluation value of each of a plurality of prescribed PMIs (PMIs in a codebook). In the present embodiment, the evaluation value of the PMI indicates an interference level assumed when the PMI is applied. Then, the UE 100-1 acquires a plurality of PMIs with a low interference level as BC-PMIs. Hereinafter, the number of the acquired BC-PMIs is defined as Nbcpmi.

In step S103, the UE 100-1 determines whether the Nbcpmi is equal to or more than the threshold value Tc.

When the determination result of step S103 is "No", the UE 100-1 sets the plurality of BC-PMIs acquired in step S102 in a feedback message to the eNB 200-2 in step S104. Furthermore, the UE 100-1 sets "0" in flag fields of the feedback message as a first identifier for identifying the BC-PMIs. Moreover, the UE 100-1 sets a value of the Nbcpmi in data length (Length) fields of the feedback message.

Meanwhile, when the determination result of step S103 is "Yes", the UE 100-1 acquires WC-PMIs instead of the BC-PMIs in step S105. For example, the UE 100-1 acquires a plurality of PMIs with a high interference level as the WC-PMIs from a plurality of prescribed PMIs. Alternatively, the UE 100-1 may acquire PMIs, except for the BC-PMIs acquired in step S102, as the WC-PMIs from the plurality of prescribed PMIs. Hereinafter, the number of the acquired WC-PMIs is defined as Npmi.

Then, in step S106, the UE 100-1 sets the WC-PMIs acquired in step S105 in a feedback message to the eNB 200-2. Furthermore, the UE 100-1 sets "1" in flag fields of the feedback message as a second identifier for identifying the WC-PMIs. Moreover, the UE 100-1 sets a value of the Npmi in data length (Length) fields of the feedback message.

In step S107, the UE 100-1 feeds back the feedback message to the eNB 200-2. In the case of feeding back the feedback message to the eNB 200-2 via the eNB 200-1, the UE 100-1 transmits, to the eNB 200-1, a feedback message addressed to the eNB 200-2.

In addition, in the case of feeding back the BC-PMI for each subband, the processes of steps S102 to S106 are performed for each subband.

Figure 10:
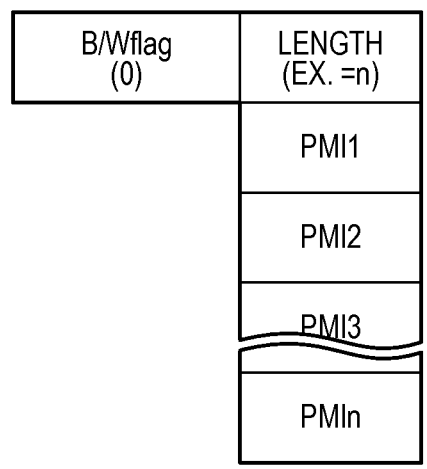
FIG. 10 is a message configuration diagram of a feedback message according to the first embodiment.

FIG. 10 is a message configuration diagram of the feedback message according to the present embodiment.

As illustrated in FIG. 10, the feedback message according to the present embodiment includes flag (B/Wflag) fields indicating the BC-PMIs or the WC-PMIs (the BC-PMIs or the WC-PMIs) and data length (Length) fields indicating the number of PMIs to be fed back, in addition to fields for storing the PMIs to be fed back.

As described above, according to the present embodiment, when the BC-PMI to be fed back to the eNB 200-2 is equal to or more than the threshold value Tc, the BC-PMI is switched to the WC-PMI, so that it is possible to reduce the amount of information to be fed back.

Second Embodiment

Hereinafter, a second embodiment will be described while focusing on the differences from the first embodiment.

In the aforementioned first embodiment, basically, the UE 100-1 feeds back a plurality of BC-PMIs to the eNB 200-2. However, since the transmission directivity of the eNB 200-2 is influenced by a rank, it is preferred to perform the feedback in consideration of the rank.

In this regard, in the present embodiment, the UE 100-1 feeds back the BC-PMIs to the eNB 200-2 for each of a plurality of prescribed RIs. That is, the UE 100-1 feeds back a combination of the RIs and the BC-PMIs to the eNB 200-2. In the present embodiment, the RI corresponds to rank information.

A feedback message for the eNB 200-2 includes a plurality of combinations of the BC-PMIs, in which the influence of interference from the eNB 200-2 to the UE 100-1 is small, and the RIs. In addition, when it is set to perform the feedback of the BC-PMIs and the RIs for each subband, the feedback message includes a plurality of combinations of the BC-PMIs and the RIs for one subband.

The eNB 200-2 assigns a radio resource, which is equal to that assigned to the UE 100-1, to the UE 100-2 in the cell of the eNB 200-2, which feeds back PMI and RI coinciding with one of the combinations of the BC-PMIs and the RIs fed back from the UE 100-1. Also, the eNB 200-2 performs transmission to the UE 100-2 according to the matching PMI and the RI.

However, in such a CB-CoMP operation, when the UE 100-1 feeds back a number of BC-PMIs, there is a problem that the amount of information to be fed back is large and a consumption amount of a radio resource is large, similarly to the first embodiment.

In this regard, in the present embodiment, when a plurality of BC-PMIs are fed back to the eNB 200-2 for each RI and the number of the BC-PMIs for one RI is equal to or more than the threshold value Tc, the UE 100-1 switches PMI for the RI to WC (Worst Companion)-PMI.

Figure 11:
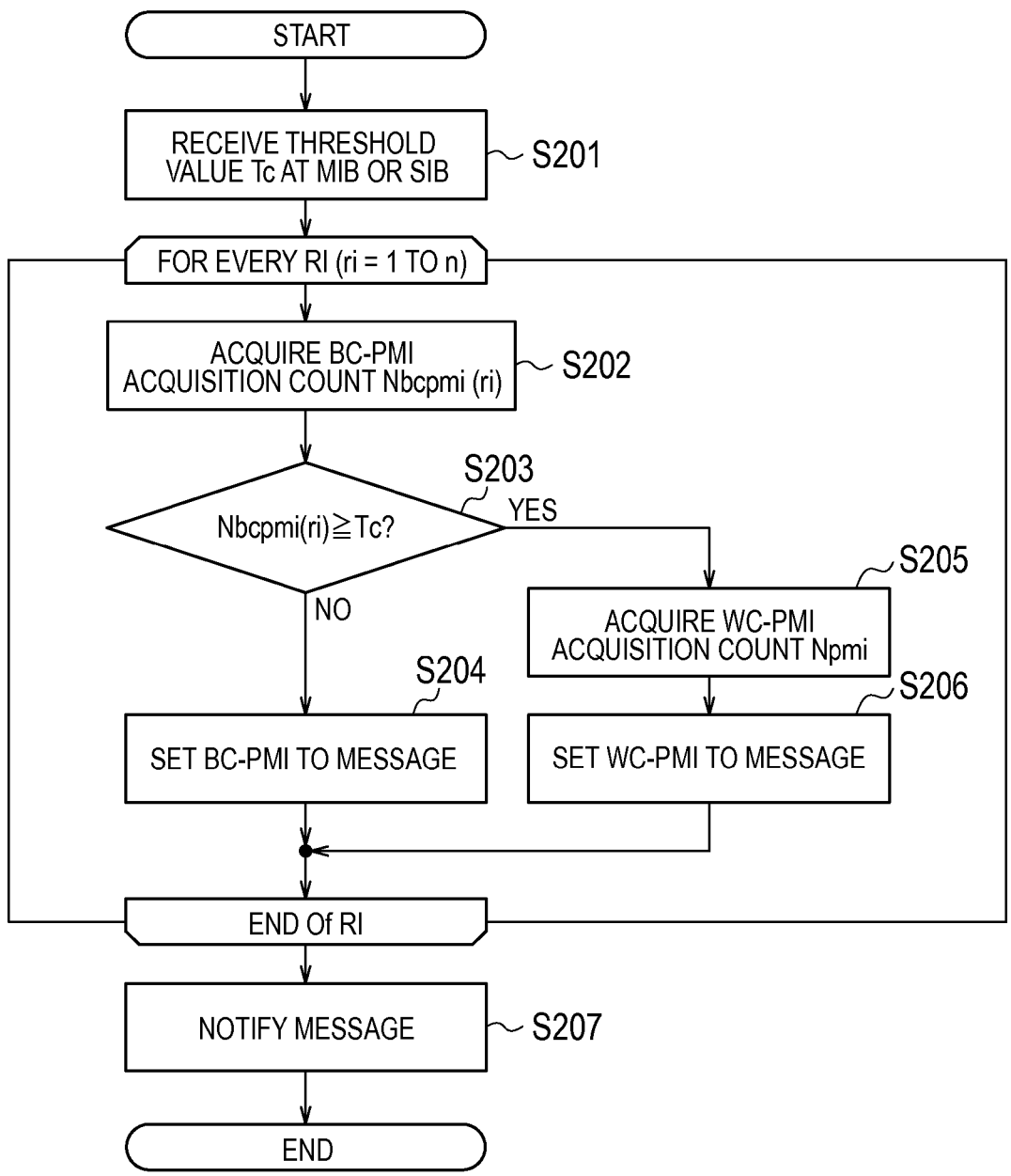
FIG. 11 is an operation flow diagram of UE according to a second embodiment.

FIG. 11 is an operation flow diagram of the UE 100-1 according to the present embodiment. Hereinafter, the case is assumed, in which the BC-PMI is not fed back for each subband and is fed back for an entire downlink band. Furthermore, a description of an operation overlapping that of the first embodiment will be omitted.

As illustrated in FIG. 11, in step S201, the UE 100-1 receives information indicating the threshold value Tc from the eNB 200-1 or the eNB 200-2 and stores the information.

Processes of step S202 to step S206 are performed for each RI.

In step S202, on the basis of a reference signal and the like from the eNB 200-2, the UE 100-1 acquires a plurality of PMIs with a low interference level as BC-PMIs. Hereinafter, the number of the acquired BC-PMIs is defined as Nbcpmi.

In step S203, the UE 100-1 determines whether the Nbcpmi is equal to or more than the threshold value Tc.

When the determination result of step S203 is "No", the UE 100-1 associates the plurality of BC-PMIs acquired in step S202 with target RI and sets the associated BC-PMIs in a feedback message to the eNB 200-2 in step S204. Furthermore, the UE 100-1 associates "0" with the target RI and sets the associated "0" in flag fields of the feedback message as a first identifier for identifying the BC-PMIs. Moreover, the UE 100-1 associates a value of the Nbcpmi with the target RI and sets the associated value in data length (Length) fields of the feedback message.

Meanwhile, when the determination result of step S203 is "Yes", the UE 100-1 acquires WC-PMIs instead of the BC-PMIs in step S205. Hereinafter, the number of the acquired WC-PMIs is defined as Npmi.

Then, in step S206, the UE 100-1 associates the WC-PMIs acquired in step S205 with the target RI and sets the associated WC-PMIs in a feedback message to the eNB 200-2. Furthermore, the UE 100-1 associates "1" with the target RI and sets the associated "1" in flag fields of the feedback message as a second identifier for identifying the WC-PMIs. Moreover, the UE 100-1 associates a value of the Npmi with the target RI and sets the associated value in data length (Length) fields of the feedback message.

In step S207, the UE 100-1 feeds back the feedback message to the eNB 200-2.

Figure 12:
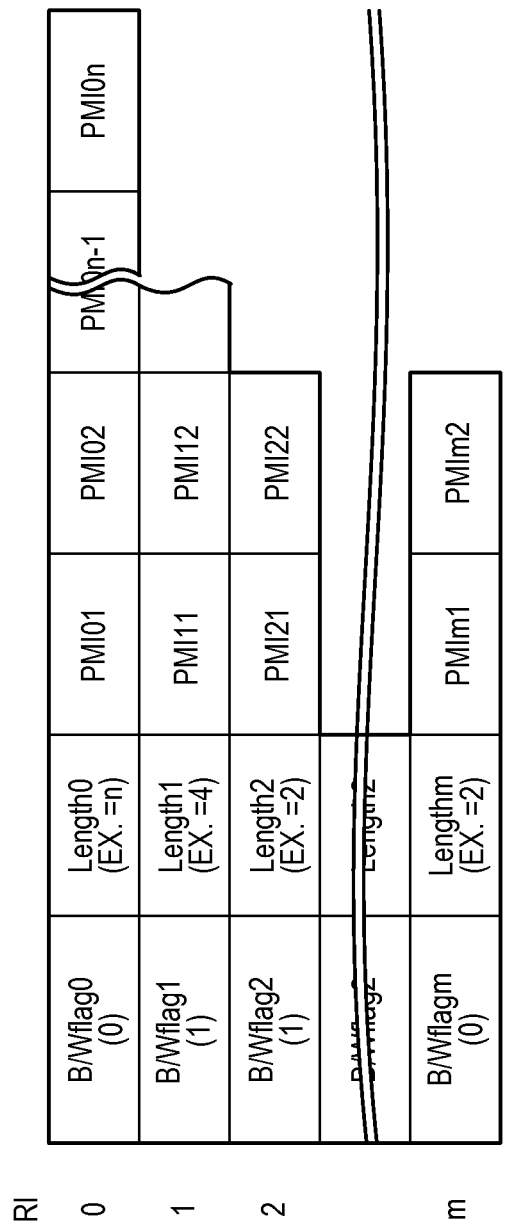
FIG. 12 is a message configuration diagram of a feedback message according to the second embodiment.

FIG. 12 is a message configuration diagram of the feedback message according to the present embodiment.

As illustrated in FIG. 12, the feedback message according to the present embodiment includes, for each RI, fields for storing the PMIs (the BC-PMIs or the WC-PMIs) to be fed back, flag (B/Wflag) fields indicating the BC-PMIs or the WC-PMIs, and data length (Length) fields indicating the number of PMIs to be fed back. In the example of FIG. 12, the BC-PMIs are stored for RI "0" and "m" and the WC-PMIs are stored for RI "1" and "2".

Other Embodiments

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

The aforementioned embodiments have described the operation in which the BC-PMI is switched to the WC-PMI on the basis of the feedback of the BC-PMI. However, it may be possible to perform an operation in which the WC-PMI is switched to the BC-PMI on the basis of the feedback of the WC-PMI. In this case, it is sufficient if a relation of the "BC-PMI" and the "WC-PMI" in the aforementioned operation flow is exchanged. That is, when a plurality of WC-PMIs are fed back to the eNB 200-2 and the number of the WC-PMIs is equal to or more than the threshold value Tc, the UE 100-1 switches PMI, which is fed back to the eNB 200-2, to the BC-PMI.

The aforementioned embodiments have described the operation in which the BC-PMI (or the WC-PMI) is fed back in the CB-CoMP. However, the present invention is not limited to CB-CoMP, and can also be applied to MU (Multi User)-MIMO (Multiple Input Multiple Output).

Figure 13:
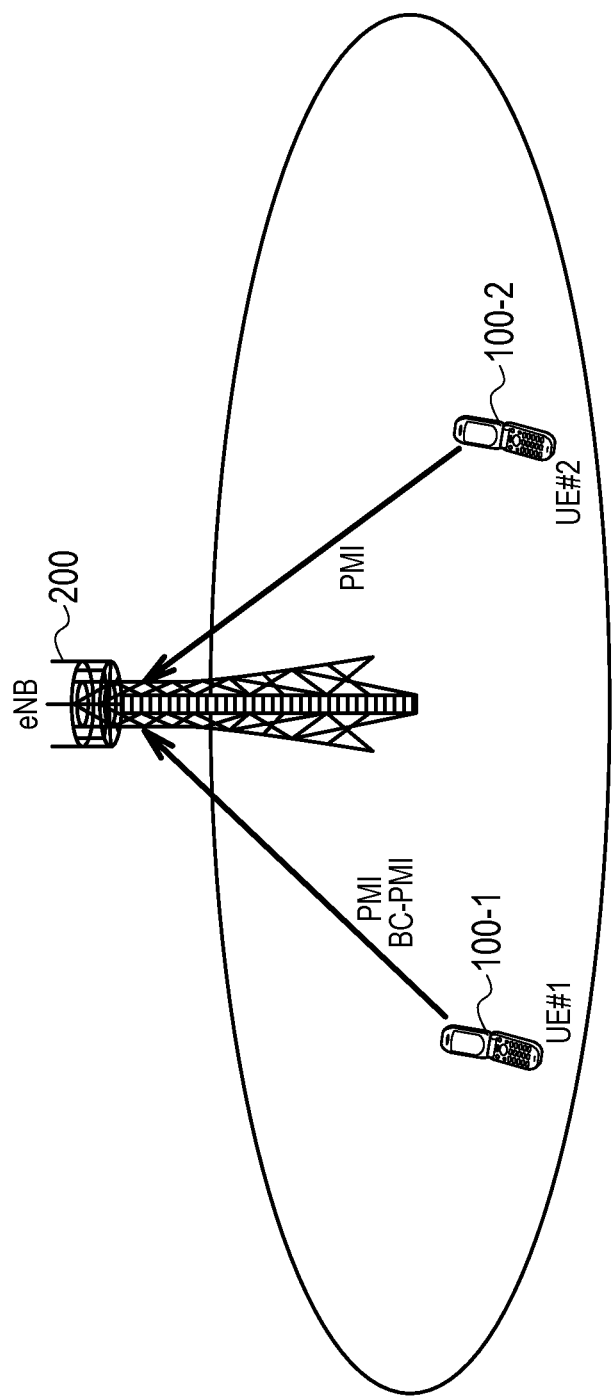
FIG. 13 is a diagram illustrating an operation environment according to another embodiment.
Figure 14:
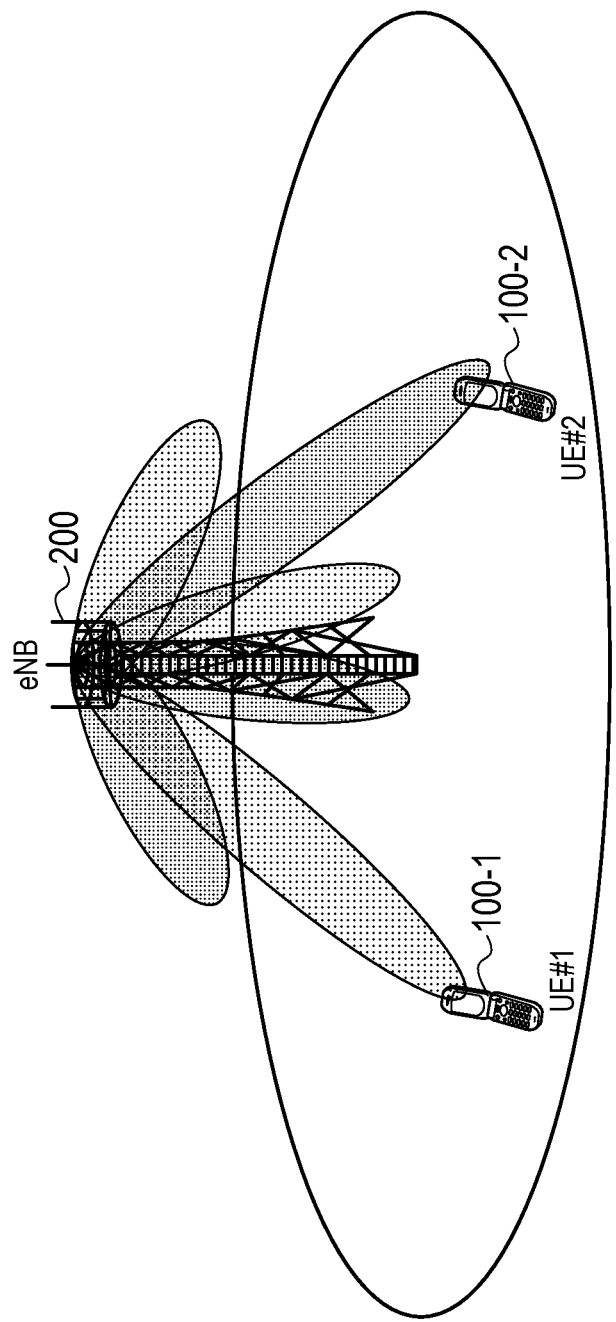
FIG. 14 is a diagram illustrating an operation environment according to another embodiment.

FIG. 13 and FIG. 14 are diagrams illustrating an operation environment according to another embodiment.

As illustrated in FIG. 13, the UE 100-1 and the UE 100-2 establish a connection with a cell of eNB 200. That is, the UE 100-1 and the UE 100-2 perform communication with assuming the cell of the eNB 200 as the serving cell.

In order to improve the utilization efficiency of a frequency, the eNB 200 performs MU-MIMO. Specifically, the eNB 200 performs transmission to the UE 100-1 and the UE 100-2 by using the same radio resource.

The UE 100-1 feeds back BC-PMI to the eNB 200 in addition to normal feedback (PMI, RI, and CQI) for the eNB 200. The eNB 200 assigns a radio resource, which is equal to that assigned to the UE 100-1, to the UE 100-2 that feeds back PMI coinciding with the BC-PMI fed back from the UE 100-1. Then, the eNB 200 performs transmission to the UE 100-2 according to the coinciding PMI.

As a consequence, as illustrated in FIG. 14, the eNB 200 is able to perform transmission to the UE 100-2 by directing a null toward the UE 100-1 and directing a beam toward the UE 100-2. Furthermore, the eNB 200 performs transmission to the UE 100-1 according to the normal PMI fed back from the UE 100-1. As a result, the eNB 200 is able to direct a beam to the UE 100-1.

Even in such an operation environment of MU-MIMO, the aforementioned operation flow is applicable. Specifically, it is sufficient if a feedback destination of a feedback message is set as the eNB 200 (a serving cell).

The entire contents of U.S. Provisional Application No. 61/723,037 (filed on Nov. 6, 2012) are incorporated herein by reference.

INDUSTRIAL APPLICABILITY

The present invention is useful for mobile communications field.

The invention claimed is:
1. A mobile communication system, comprising:
a first user terminal configured to feed back one of first precoder matrix information and second precoder matrix information to a base station; and
the base station configured to determine a precoder matrix to be applied to downlink multi-antenna transmission to a second user terminal based on the precoder matrix fed back, wherein
the first precoder matrix information indicates the precoder matrix that is preferred to the first user terminal,
the second precoder matrix information indicates the precoder matrix that is not preferred to the first user terminal,
in response to a number of the first precoder matrix information being equal to or more than a threshold value, the first user terminal switches the precoder matrix information, which is to be fed back to the base station, to the second precoder matrix information, or
in response to a number of the second precoder matrix information being equal to or more than a threshold value, the first user terminal switches the precoder matrix information, which is to be fed back to the base station, to the first precoder matrix information.

2. The mobile communication system according to claim 1, wherein
when the first precoder matrix information is fed back to the base station, the first user terminal adds first identification information to the first precoder matrix information, the first identification information indicating the first precoder matrix information.

3. The mobile communication system according to claim 1, wherein
when the second precoder matrix information is fed back to the base station, the first user terminal adds second identification information to the second precoder matrix information, the second identification information indicating the second precoder matrix information.

4. The mobile communication system according to claim 1, wherein
the base station performs the downlink multi-antenna transmission by further applying a rank for defining number of downlink signal sequences, and
for each of plural pieces of rank information, the first user terminal feeds back the first precoder matrix information or the second precoder matrix information to the base station.

5. The mobile communication system according to claim 1, wherein
when the first precoder matrix information is fed back from the first user terminal, the base station assigns a radio resource, which is equal to a radio resource assigned to the first user terminal, to the second user terminal that feeds back precoder matrix information coinciding with the first precoder matrix information, and performs downlink multi-antenna transmission to the second user terminal according to the coinciding precoder matrix information.

6. The mobile communication system according to claim 1, wherein
when the second precoder matrix information is fed back from the first user terminal, the base station assigns a radio resource, which is equal to a radio resource assigned to the first user terminal, to the second user terminal that feeds back precoder matrix information not coinciding with the second precoder matrix information, and performs downlink multi-antenna transmission to the second user terminal according to the non-coinciding precoder matrix information.

7. The mobile communication system according to claim 1, wherein
the base station controls a cell adjacent to a serving cell of the first user terminal.

8. The mobile communication system according to claim 1, wherein
the base station controls a serving cell of the first user terminal.

9. A user terminal, comprising:
a controller configured to feed back one of first precoder matrix information and second precoder matrix information to a base station, wherein
the precoder matrix information fed back is information referred to determine, by the base station, a precoder matrix to be applied to downlink multi-antenna transmission to another user terminal,
the first precoder matrix information indicates the precoder matrix that is preferred to the user terminal,
the second precoder matrix information indicates the precoder matrix that is not preferred to the user terminal,
in response to a number of the first precoder matrix information being equal to or more than a threshold value, the user terminal switches the precoder matrix information, which is to be fed back to the base station, to the second precoder matrix information, or
in response to a number of the second precoder matrix information being equal to or more than a threshold value, the user terminal switches the precoder matrix information, which is to be fed back to the base station, to the first precoder matrix information.

10. A processor for controlling a user terminal, wherein
the processor is configured to feed back one of first precoder matrix information and second precoder matrix information to a base station,
the precoder matrix information fed back is information referred to determine, by the base station, a precoder matrix to be applied to downlink multi-antenna transmission to another user terminal,
the first precoder matrix information indicates the precoder matrix that is preferred to the user terminal,
the second precoder matrix information indicates the precoder matrix that is not preferred to the user terminal,
in response to a number of the first precoder matrix information being equal to or more than a threshold value, the user terminal switches the precoder matrix information, which is to be fed back to the base station, to the second precoder matrix information, or
in response to a number of the second precoder matrix information being equal to or more than a threshold value, the user terminal switches the precoder matrix information, which is to be fed back to the base station, to the first precoder matrix information.

* * * * *